United States Patent [19]

Horie et al.

[11] Patent Number: 5,014,256

[45] Date of Patent: May 7, 1991

[54] PHOTODISC APPARATUS WITH GAIN CONTROL OF TRACKING SERVO LOOP

[75] Inventors: Yuji Horie; Shoji Yoshikawa, both of Hachioji, Japan

[73] Assignee: Olympus Optical Co., Ltd., Tokyo, Japan

[21] Appl. No.: 515,015

[22] Filed: Apr. 26, 1990

[30] Foreign Application Priority Data

Apr. 27, 1989 [JP] Japan .................. 1-108034

[51] Int. Cl.⁵ .................. G11B 7/09; G11B 7/095
[52] U.S. Cl. .................. 369/44.35; 369/44.34; 369/44.13
[58] Field of Search .................. G05B/1/06

[56] References Cited

U.S. PATENT DOCUMENTS

4,707,648 11/1987 Minami .................. 369/44.34
4,866,688 9/1989 Ohtake et al. .................. 369/44.13
4,878,211 10/1989 Suzuki et al. .................. 369/44.34

Primary Examiner—Roy N. Envall, Jr.
Assistant Examiner—Hindi Nabil
Attorney, Agent, or Firm—Armstrong, Nikaido, Marmelstein, Kubovcik & Murray

[57] ABSTRACT

A gain control device for controlling the loop gain of a servo tracking system which enables a beam spot formed on a photodisc through an objective lens to trace a track on the disc. The gain control device opens the tracking servo loop and applied a drive signal to a lens actuator so as to move the objective lens across the tracks thereby generating tracking error signals. The device samples the tracking error signals and detects the amplitudes of these signals, and controls the loop gain such that the detected amplitudes fall within a predetermined allowable range.

8 Claims, 11 Drawing Sheets

FIG. 5a OUTPUT OF SENSOR 41

FIG. 5b SWITCH S1

FIG. 5c Tr. CROS. SIG.

FIG.13a JUMP DIR. PULSE

FIG.13b

FIG.13c OUTPUT OF COMPARATOR

FIG.13d OUTPUT OF COMP. WITHOUT RP

FIG.13e JUMP DIR. PULSE

FIG.13f RP

PHOTODISC APPARATUS WITH GAIN CONTROL OF TRACKING SERVO LOOP

BACKGROUND OF THE INVENTION

1. Field of the Invention

The present invention relates to a photodisc apparatus having a tracking servo means for enabling a beam spot to trace an information recording track with a high degree of accuracy.

2. Description of the Related Art

In recent years, optical information recording/reproduction apparatuses have been put to practical use, in which information is densely recorded in a recording medium by means of a light beam spot focused on the recording medium or information is read or reproduced at high speed through sensing the light reflected from the medium by means of a photosensor.

In the recording/reproduction apparatus of the kind described, it is necessary that the light beam applied to the recording medium is held in a focused state and in an on-track state, in order to record information at a high density and to read information which has been recorded at a high density. To this end, the recording-/reproduction apparatus is usually provided with a focus control means and a radial tracking control means. These control means detect, as a focus error signal and a tracking error signal, information concerning an amount of defocus of the beam and radial deviation of the beam contained in the light reflected back from the recording medium.

These control means, however, tend to suffer from fluctuations in the gains of the respective servo loops depending on various factors such as the power of the light source such as a laser diode, reflectivity of the disc, variation in the focus error signal detection system, and so forth. A fluctuation in the loop gain deteriorates the response of the servo loops to focus error and tracking error or causes an oscillation or hunting. Thus, the stability of the servo control is impaired when a change is caused in the loop gain of each servo system.

In order to overcome this problem, Japanese Patent Unexamined Publication No. 63-106003 proposes an art in which a variable gain amplifier is used as an error amplifier, wherein the gain of the variable gain amplifier is controlled in accordance with a gain constant which is set in accordance with a p—p value of an error signal which is obtained in an open state of the servo loop.

In this known art, in order to attain a high accuracy of the peak hold, the peak hold operation is conducted when the rotation speed of a spindle motor has exceeded a predetermined speed while the number of peaks of eccentricity has been increased beyond a predetermined number. It is to be noted, however, that the amplitude of a track error signal (TES) sometimes depends on the speed at which the beam spot crosses the track. The speed at which the beam crosses the track varies depending on various factors such as the amount of eccentricity. This means that the peak hold is not always conducted in an adequate manner.

To explain in more detail, in general, the center of the concentric tracks or a spiral track formed in the surface of a photodisc cannot be precisely aligned with the center of rotation of a spindle motor for driving the photodisc. In some cases, the tracks or track itself has an eccentricity with respect to the center of the disc. Such an eccentricity, particularly when it is large, causes the following problems. Namely, when a light beam is applied to the photodisc through an objective lens while the tracking servo loop is kept open, the beam spot undesirably scans the surface of the disc across the tracks due to eccentricity of the tracks with respect to the center of the spindle motor. The higher the rotation sped of the spindle motor, the greater the number of the eccentricity peaks. Conversely, the number of peaks is reduced when the rotation speed of the spindle motor is lowered. It is also to be understood that the influence of the degree of eccentricity of the spindle motor varies in each rotation of the spindle motor. Namely, the influence is large, small or zero at different rotational phases in one rotation. A tracking error signal of a waveform as shown in FIG. 1 is obtained when the tracking servo is kept off, even when an eccentricity exists.

Figure 1:
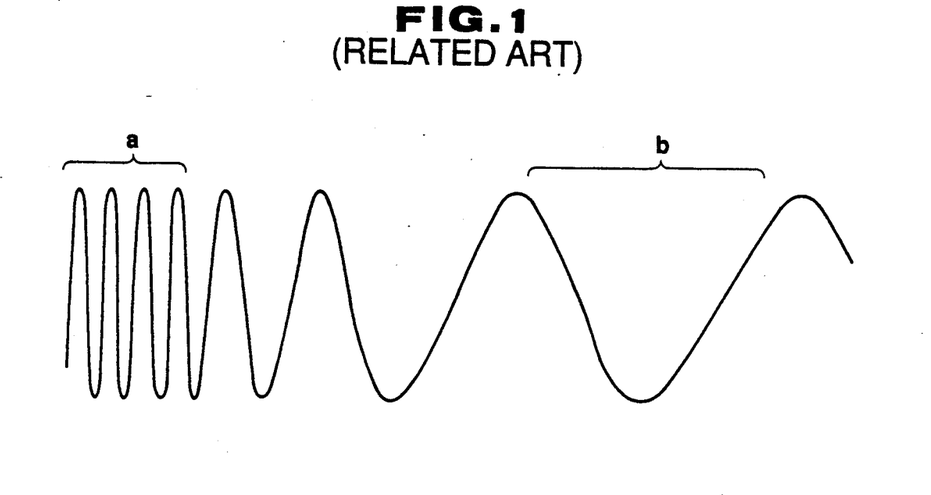
FIG. 1 is an illustration of waveform of a tracking error signal generated in a prior art.

Referring to FIG. 1, many peaks of tracking error signal are obtained in a period a. In this period, therefore, the influence of any noise on the positive and negative peak values in each short period of the tracking error signal is sufficiently small. On the other hand, in a period b, the peak values are influenced more seriously because the signal levels around the peaks are maintained for a longer time than in the period :..

The known art mentioned before does not take the eccentricity amount into consideration. Namely, the peak values of the tracking error signal are liable to be influenced by the noise, so that the accuracy of holding the peaks of the tracking error signal is impaired particularly when the eccentricity of the track in the disc is small, even when the rotation speed is enhanced.

Furthermore, an error in the peak hold tends to occur in the period in which the amount of eccentricity is small within one full rotation of the photodisc.

It is also to be pointed out that a considerably long waiting time is necessary because the detection of the peak value is conducted after the disc rotation speed has reached a predetermined level.

SUMMARY OF THE INVENTION

An object of the present invention is to provide a gain control device for a tracking servo system which enables the gain of the tracking servo loop with a high accuracy.

Another object of the present invention is to provide a gain control device which is simple in construction but yet capable of controlling gain with high accuracy.

According to the invention, a drive signal is given to a lens actuator for driving an objective lens while the tracking servo loop is kept off such that the spot of the beam applied to a photodisc through the objective lens is moved across the tracks in the photodisc. The amplitude of the track error signal produced when the beam spot crosses the tracks is measured, and the gain of a variable gain amplifier for amplifying the track error signal is controlled such that the amplitude is maintained below a predetermined allowable limit.

BRIEF DESCRIPTION OF THE DRAWINGS

FIGS. 9a to 10c are waveform charts illustrative of the operation of the second embodiment;

DESCRIPTION OF THE PREFERRED EMBODIMENTS

Figure 3:
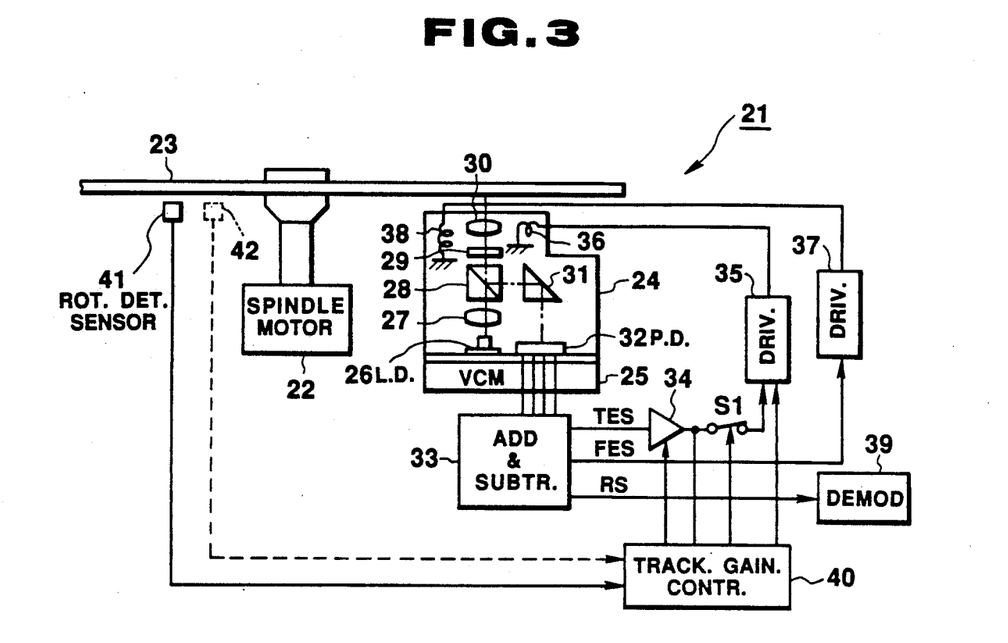
FIG. 3 is a schematic side elevational view showing the entire part of the first embodiment.

FIG. 3 shows a first embodiment of the optical recording/reproduction apparatus (referred to as "photodisc apparatus" hereinafter). The apparatus generally designated at 21 has a spindle moor 22 for driving a disc-type recording medium (referred to as "photodisc" hereinafter) 23. The apparatus 21 also has a photo-pickup 24 arranged to oppose a surface of the photodisc 23. The photo-pickup 24 is secured to a carriage which is moved by a pickup driving mechanism such as a voice coil motor (abbreviated as "VCM") 25 such that the pickup 24 moves in the radial direction of the photodisc 23, i.e., in the direction of an arrow T across concentric tracks or a spiral track in the surface of the photodisc 23.

The above-mentioned pickup 24 mounts a laser diode 26 as means for generating alight beam. The light beam generated by the laser diode 26 is collimated by a collimator lens 27 and is made incident to a polarized beam splitter 28 in, for example, P polarization, and is almost fully transmitted through the beam splitter 28. The transmitted light is circularly polarized through a quarter wave plate 29 and is focused through an objective lens 30 onto the photodisc 30. The light reflected by the photodisc 23 is condensed by the objective lens 30 and is S-polarized through the quarter wave plate 29 and reflected by the polarized beam splitter 28. The light reflected by the polarized beam splitter 28 is made to be incident on a critical angle prism 31 and the light from this prism 31 is received by a quadrant photodetector 32. The output from the photodetector 32 is input to an adding/subtracting circuit 33 having an adder and a subtracter, whereby a tracking error signal, TES, focus error signal FES and an RF reproduction signal RS are obtained.

The tracking error signal TES is delivered, through a variable gain amplifier 34, a switch S1 and a drive circuit 35, to a tracking coil 36 which serves as a lens actuator.

When the switch S1 is in an on state, i.e., when the tracking servo loop is closed, the objective lens 30 is held in a tracking condition for enabling the spot of the beam transmitted through this lens 30 to tract an object track in the photodisc 23.

A focusing error signal FES is supplied to a focusing coil 38 through the adder 33 and the drive circuit 37.

The RF reproduction signal RS is delivered to a demodulation circuit 39 for reproduction of the information.

The gain of the variable gain amplifier 34 is controllable by means of a tracking gain control circuit 40.

The tracking gain controller 40 controls the state of the switch S1. When the switch S1 is off, this circuit 40 delivers a drive signal for driving the objective lens 30 to the tracking coil 36 through the drive circuit 35. The tracking gain control circuit 40 also picks up the output signal from the variable gain amplifier 34 and detects the amplitude of the signal. The circuit 40 then controls the gain of the variable gain amplifier 34 such that the detected amplitude falls within a predetermined allowable range.

Figure 2:
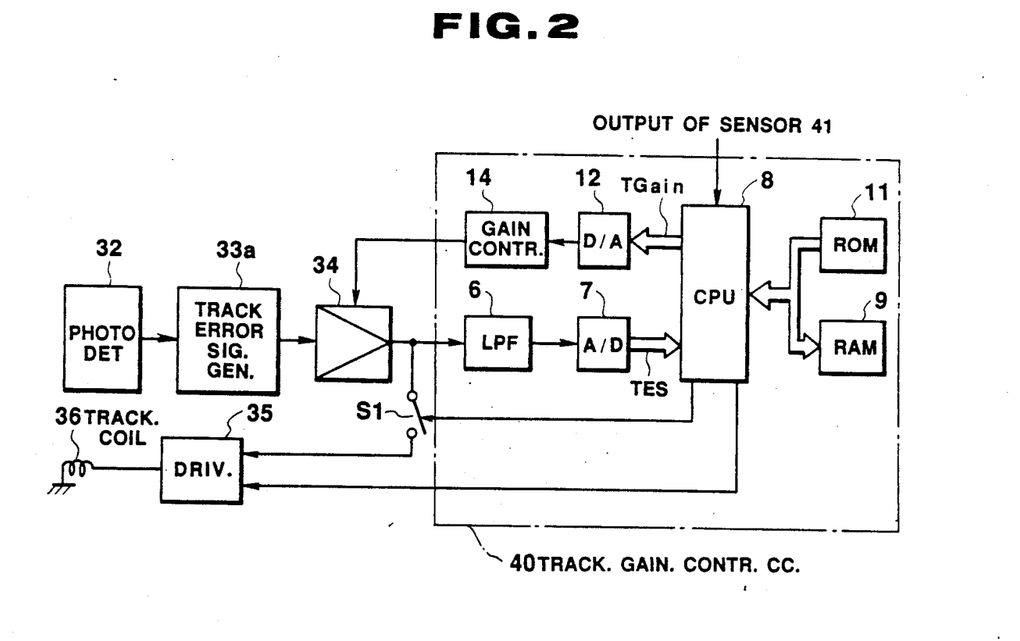
FIG. 2 is a block diagram of a first embodiment of an optical recording/reproducing apparatus of the present invention.

FIG. 2 shows the construction of the tracking gain control system including the tracking gain control circuit 40.

An output signal from the photodetector 32 is delivered to the adding/subtracting circuit 33. A track error signal generating circuit 33a in the circuit 33 forms a tracking error signal TES which is supplied to the tracking gain control circuit 40 through the variable gain amplifier 34. The tracking error signal TES is then made to pass through a low-pass filter 6 in the tracking gain control circuit 40 so that a noise component is removed therefrom. The tracking error signal is then converted into a digital signal through an A/D converter 7 and is then input to a CPU 8. The CPU 8 is connected through a BUS line to a RAM 9 which forms a work area and which is used as a memory for storing, for example, set values of the tracking error signals during the gain control, and also to a ROM 11 in which a predetermined allowable range of the amplitude is written. When a tracking gain control is to be conducted, the CPU 9 operates to turn the switch S1 off and delivers a track cross signal to the drive circuit 35. In response to this track cross signal, a signal is delivered to the tracking coil 36 to cause the latter to drive the objective lens 30 across the tracks. A tracking error signal obtained as a result of this operation is input to the CPU 8 through the low-pass filter 6 and the A/D converter 7. The amplitude of the tracking error signal TES varies according to the gain set in the variable gain amplifier 34.

The CPU 8 delivers a gain setting signal TGain to the variable gain amplifier 34 through a D/A converter 12 and a gain controller 14. The level of the gain setting signal TGain is varied such that the amplitude of the tracking error signal TES input through the A/D converter 7 falls within the allowable range stored in the ROM 11, whereby the tracking gain is controlled.

Figure 4:
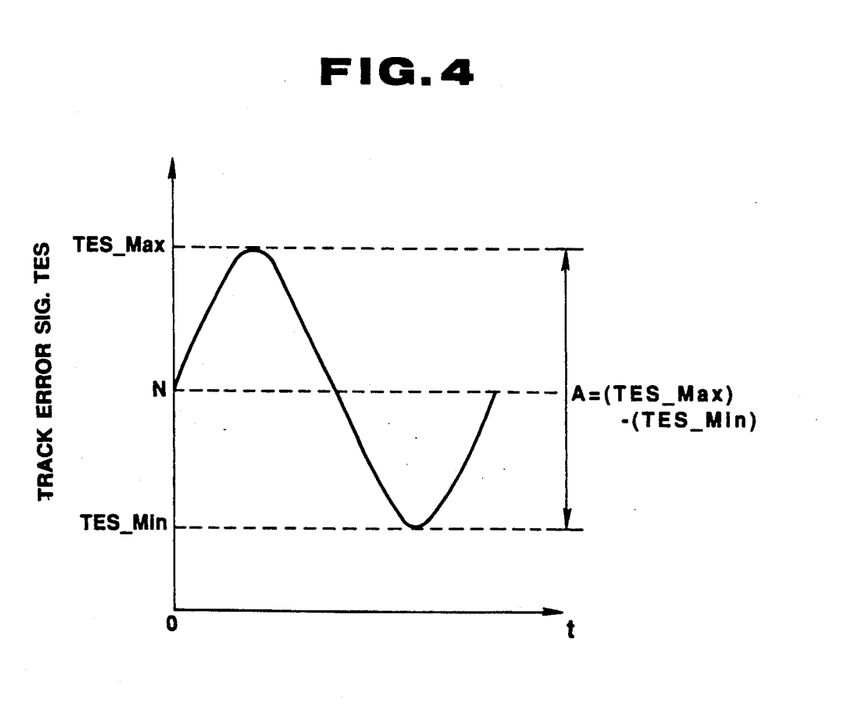
FIG. 4 is a waveform chart showing the waveform of tracking error signal generated in the first embodiment.

As will be understood from the foregoing description, the control of the gain of the variable gain amplifier 34 is conducted with the Tr servo loop held in an open state. FIG. 4 shows the waveform of the track error signal TES which is formed when the beam spot has been moved across a track while the tracking servo loop is open. This waveform tends to be modulated by the track crossing speed of the beam spot which is determined by the amount of eccentricity of the photodisc 23. In order to effect a stable gain control through elimination of the influence of the eccentricity, the following measure is taken in the first embodiment under description. Namely, in this embodiment, when the tracking error signal is monitored, a track cross signal for enabling a track jump is delivered to the drive circuit 35 so as to move the objective lens 30 in a track jumping manner. The tracking error signal TES formed as a result of the track jump is sampled for a predetermined period by the A/D converter 7 through the low-pass filter 6 and is then input to the CPU 8. The CPU 8 then reads the maximum and minimum values TES-Max and TES-Min of the track error signal TES. After completion of the sampling, the track cross signal which has been delivered to the drive circuit 35 is turned off and the amplitude A (detected p—p value) of the tracking error signal TES is computed. The CPU 8 then compares the detected p—p value A with a standard p—p value which has been stored in the ROM 11. When the difference between the detected p—p value A and the standard p—p value does not fall within the predetermined allowable range, the CPU 8 operates to vary the output of the D/A converter 12 in such a manner as to reduce the above-mentioned difference, whereby the gain of the variable gain amplifier 34 is controlled by the gain control section 14. The CPU 8 continues and repeats this operation until the difference between the detected p—p value A and the standard p—p value comes to fall within the allowable range. In the arrangement shown in FIG. 2, the signal for driving the objective lens is controlled by the CPU 8. This, however, is not exclusive and the control may be conducted by other means than the CPU 8. When the tracking servo loop is in the closed state after the completion of gain control of the variable gain amplifier 34, the output from the variable gain amplifier 34 is supplied to the drive circuit 35 so that the objective lens 30 is driven in such a manner as to correctly trace the object track.

The variable gain amplifier 34 maybe of the type which changes its gain in accordance with a change in the voltage level of a signal supplied thereto. In such a case, the gain control section 14 is made up from a voltage hold (sample hold) circuit capable of holding the level of the voltage delivered from the D/A converter 12.

Referring now to FIG. 3, a rotation sensor 41 for sensing rotation of the photodisc 23 is provided in the apparatus. The rotation sensor 41 includes, for example, a photo-reflector capable of detecting a photo-reflective portion which is provided at a portion of the photodisc 23 in the circumferential direction. The CPU 8 in the tracking gain control circuit 40 is capable of receiving the output from this sensor 41. The recording or reproducing operation is commenced when the rotation speed of the photodisc 23 sensed through the rotation sensor 41 has reached a predetermined speed.

Figure 5A:
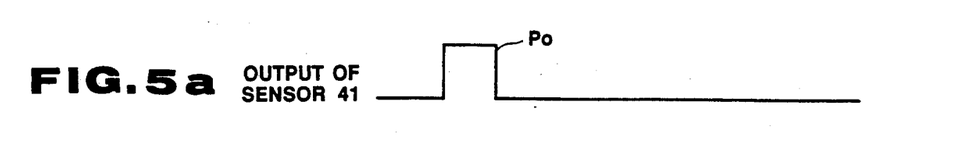
FIGS. 5a to 5c are illustrations of a method of determining the timing of a tracking gain control operation in the first embodiment.
Figures 5B, 5C:
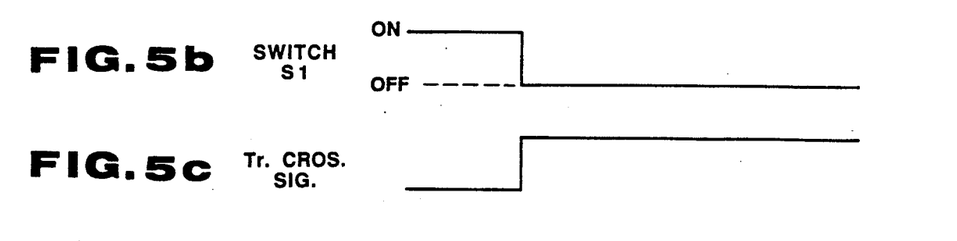

In the first embodiment of the invention, a pulse Po indicative of the rotation of the photodisc 23 is delivered from the sensor 41 to the CPU 8 as shown in FIG. 5a. In response to this pulse Po, the CPU turns the switch S1 off as shown in FIG. 5b and delivers the track cross signal to the drive circuit 35 as shown in FIG. 5c.

The level of the track cross signal is determined such that the frequency of the tracking error signal to be obtained, i.e., the number of tracks to be crossed, is greater than the frequency (number of tracks crossed) of the tracking error signal corresponding to the maximum credible eccentricity.

Therefore, the beam spot crosses tracks at a much higher crossing speed than that caused by eccentricity if any, so that a tracking error signal of a waveform shown in FIG. 4 is obtained without being substantially influenced by the eccentricity.

The gain setting process performed by the CPU 8 will be explained with reference to flow charts shown in FIGS. 6a to 7c. It is assumed here that the disc rotates at 1800 rpm, while the A/D converter 7 and the D/A converter 12 are of 8 bits and 6 bits, respectively.

Figure 6A:
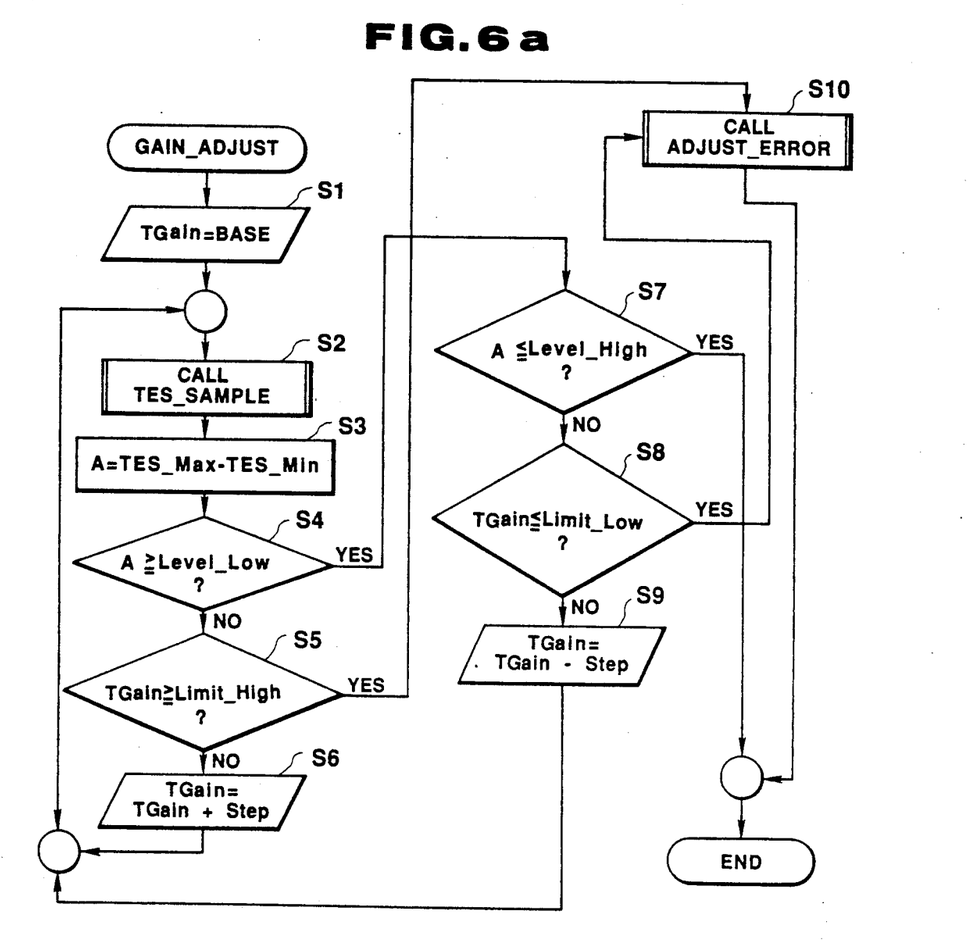
FIGS. 6a to 6c are flow charts of a process for a gain control in the first embodiment.
Figure 6B:
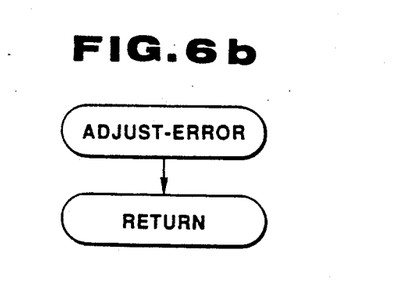
Figure 6C:
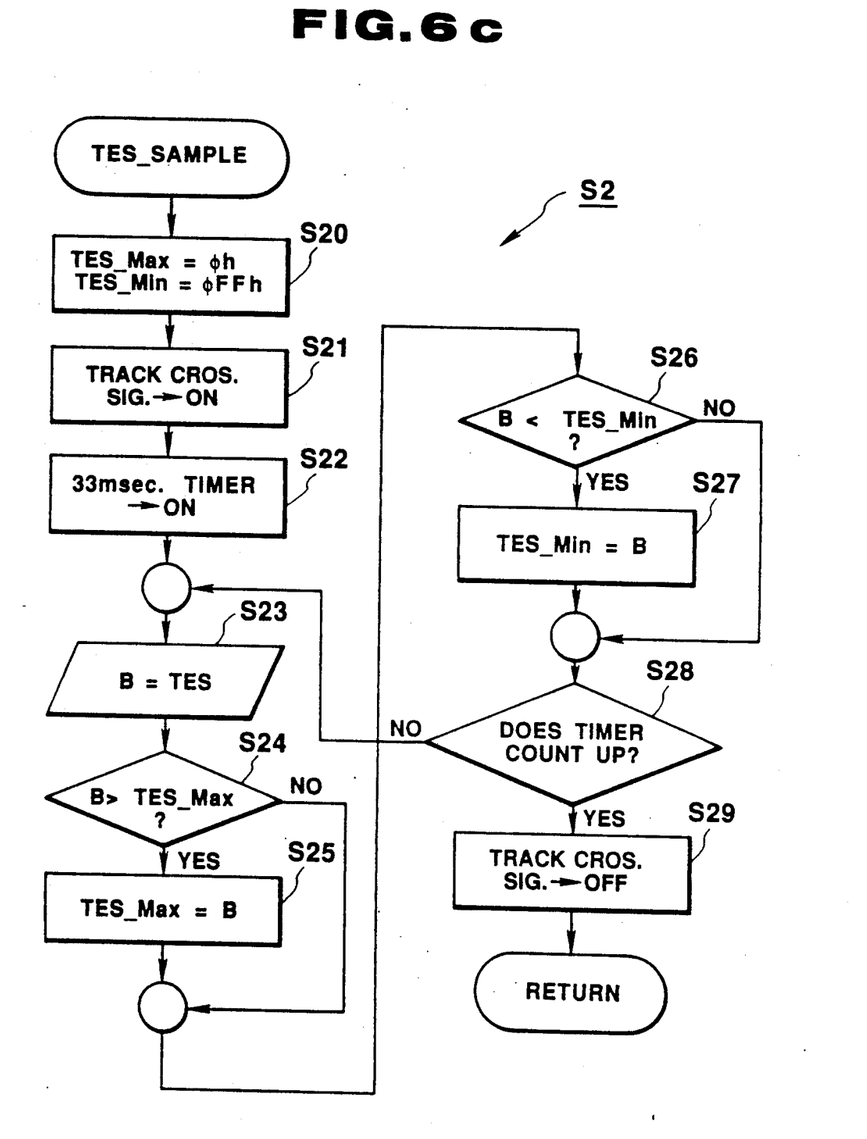

FIGS. 6a to 6c show flow charts showing a process for initial setting of the gain. In step S 1, 32 (Base) which is ½ the width of variation is set as initial data in the D/A converter 12. Then, a sub-routine for executing the sampling of tracking error signal in Step S 2 is called. This sub-routine is shown in FIG. 6c. Step S 20 conducts initial setting of the RAM 9. More specifically, the maximum value TES-Max and the minimum value TES-Min of the tracking error signal are set to 0 (hexa-decimal) and FF (hexa-decimal), respectively. The next step S 21 turns the track cross signal on. A timer for determining the sampling time is started in the next step S 22. In this embodiment, the sampling is conducted throughout a period of one full rotation of the disc. In a step S 23, the track error signals from the A/D converter 7 are sampled. The level of the sampled tracking error signals TES is represented by B. In the next step S 24, whether this value B is greater than the maximum value TES-MAX of the tracking error signal TES is determined. If the answer is YES, the process proceeds to a step S 25 in which the maximum value TES-Max is substituted with this value B, thus updating the content of the RAM 9. The process then proceeds to the next step S 26. Conversely, when the value B is not greater than the maximum value TES-Max, the process proceeds directly to the step S 26 skipping over the step S 25.

The step S 26 determines whether the sampled value B is smaller than the minimum value TES-Min of the tracking error signal. If the answer is YES, the process proceeds to the next step S 27 in which the minimum value TES-Min is substituted by the value B, thus updating the content of the RAM 9. The process then proceeds to the next step S 28. Conversely, when the answer to the query posed in the step S 27 is NO, the process directly skips to the step S 28.

The step S 28 determines whether the sampling time is over. If not, the process returns to the step S 23. If the sampling time is over, the track cross signal is turned off in the next step S 29, whereby the sampling is finished. After completion of the sampling, the detected p—p value A is computed from the maximum and minimum values TES-Max and TES-Min in a step S 33.

In a step S 4, whether the detected p—p value A is not smaller than a predetermined lower limit value Level-Low stored in the ROM 11. If the answer is YES, the process proceeds to a step S 7 in which whether the detected p—p value A is not greater than a predetermined upper limit level Level-High. When the answer is YES, the CPU determines that the gain is adequately maintained, and ceases the process.

However, is the step S 4 has proved that the value A is below the lower limit level Level-Low of the allowable range, the process proceeds to a step S 5 which determines whether the set value TGain of the gain of the D/A converter 12 is not smaller than the upper limit value Limit-High e.g., 63, of an allowable variation range. If the answer is NO, i.e., if the set value TGain is below the upper limit value Limit-High (this is the case of the step S 1), the process proceeds to the next step S 6 in which the set value of the gain TGain is incremented by one step, e.g., by one of several bits. The process then returns to step S 2.

As the set value TGain of the gain is incremented step by step, the detected p—p value A usually comes to exceed the lower limit value Level-Low of the allowable range, so that the process proceeds to the next step S 7. However, if, for example, the photodisc 23 is defective so that its reflectivity is extremely low, the set value TGain of the gain may reach or exceed the upper limit value Limit-High of the allowable range before the detected p—p value A reaches the lower limit value Level-Low of the allowable range. In such a case, the process proceeds to a step S 10 which commences a control error sub-routine, so that the process is ceased without effecting any control as shown in FIG. 6b.

If the step S 7 has proved that the detected p—p value A is greater than the upper limit value Level-High of the allowable range, the process proceeds to a step S 8 in which whether the gain set value T Gain is not greater than the lower limit value Limit-Low of the allowable range. If the answer is NO, the gain set value TGain is decreased one step and the process is returned to the step S 2. On the other hand, if the answer to the query posed in the step S 8 is YES as in the case of an extremely large reflectivity, the gain control error routine of the step S 10 is followed, thus terminating the control process.

Thus, in the gain control process conducted in this embodiment, the level A (or amplitude) of the track error signal is deflected under the conditions where the gain TGain is set at a level substantially midst the allowable range, and whether the value A falls within an allowable range. The gain control process is ceased if this value A falls within the allowable range. Conversely, when this value A exceeds the upper limit value of the allowable range, the gain set value TGain is decreased step by step, whereas, when the value A is below the lower limit, the gain set value TGain is increased step by step. Consequently, the tracking gain is finally controlled to a value which makes the level of the tracking error signal fall within a predetermined range.

A description will now be given of a fine gain control process performed by the CPU after the initial gain control, with specific reference to FIGS. 7a to 7c.

It is assumed here that the photodisc 23 has spiral tracks. In this case, in order to enable the objective lens to trace a specific track, it is necessary to effect a kickback of the objective lens per each rotation of the disc.

Figures 7A, 7B:
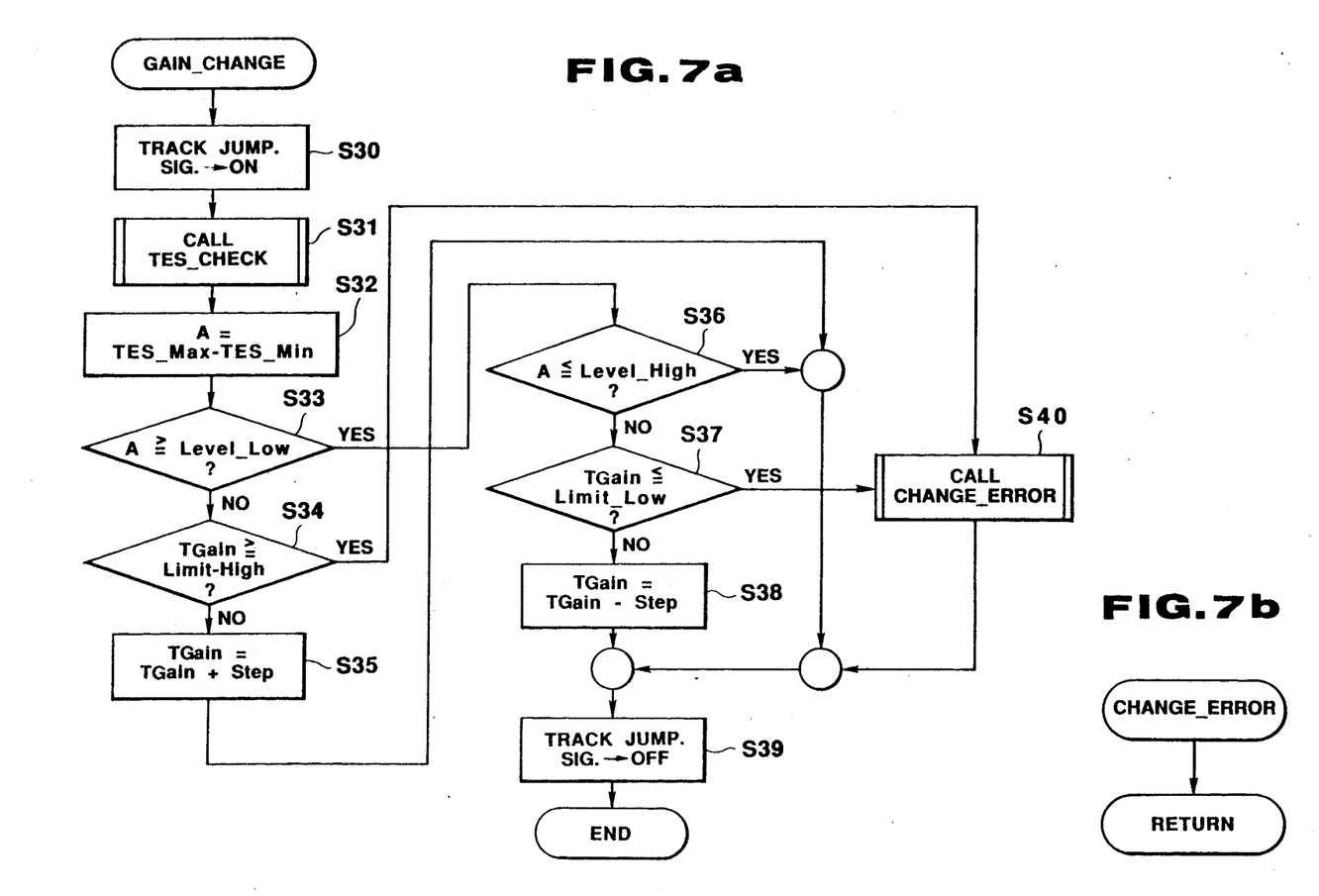
FIGS. 7a to 7c are flow chats of a process for a fine gain control in the first embodiment.
Figure 7C:
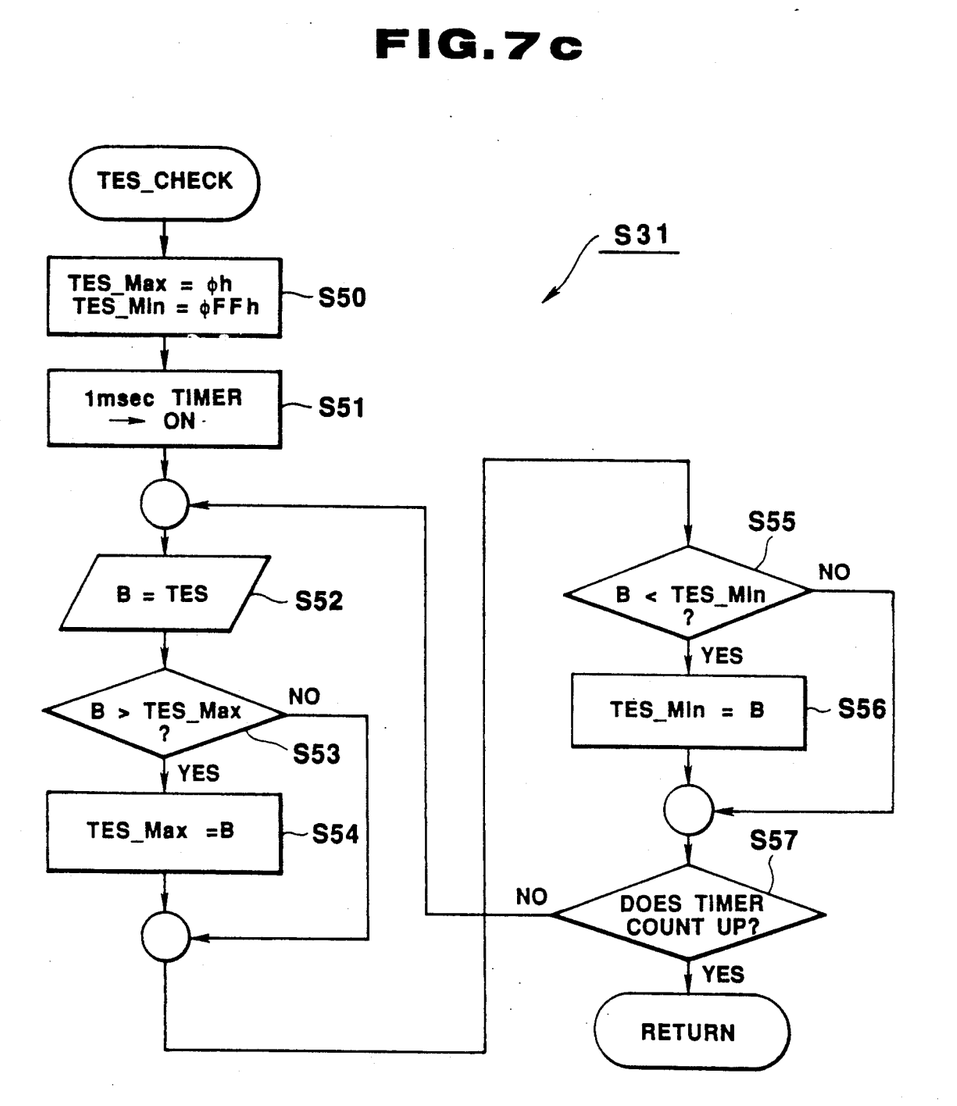

The process explained hereinunder with reference to FIGS. 7a to 7c is for effecting a fine gain control by sampling a track error signal which is produced when the objective lens is kicked back. The time required for the kick back is 1 msec.

In a step S 30, a track jump signal for effecting a kick back is turned on. In the next step S 31, a routine TES-CHECK is called. In this routine TES-CHECK, as shown in FIG. 7b, an initial setting of the RAM 9 is conducted in a step S 50, and a 1 msec timer is started in the next step S 51. Then, the tracking error signals TE are sampled in a step S 52. The next step S 53 determines whether the value B obtained through the sampling is greater than the maximum value TES-Max of the track error signal stored in the RAM 9. If the answer is YES, the process proceeds to a next step S 54 in which the maximum value TES-Max is substituted with this value B, thus updating the content of the RAM 9. The process then proceeds to a step S 55. Conversely, when the answer is NO, the process directly proceeds to the step S 55 in which whether the value B is smaller than the minimum value TES-Min of the tracking error signal is determined. When the answer is YES, the value B is set as the new lower limit value TES-Min, and the process then proceeds to a step S 57. When the answer is NO, the process directly proceeds to the step S 57. The step S 57 determines whether the sampling time is over. If the sampling time is not over, the process returns to the step S 2. However, if the sampling time is over, the process returns to the step S 31.

A step S 32 computes the detected p—p value A. Steps S 33 and S 36 are executed to determine whether the detected p—p value A falls within an allowable range determined by the lower limit value Level-Low and the upper limit value Level-High stored in the ROM 11. If the detected p—p value A falls within this range, the track jump signal is turned off in a step S 39 thus terminating the process. However, if the detected p—p value A falls out of the above-mentioned allowable range, steps S 34 and S 37 are executed to determine whether the set value of the D/A converter 12 is within an allowable range between, for example, Limit-Low=0 and Limit-High=63. If the set value of the gain of the D/A converter falls within this range, steps S 35 and S 38 are executed to increment or decrement the set value of the gain of the D/A converter 12 by one or several bits, and the track jump signal is turned off to terminate the process in a step S 39. When the set value of the gain of the D/A converter falls out of the above-mentioned allowable range, the process proceeds to a step S 40 to execute an error routine.

The contents of the steps S 32 to S 39 shown in FIG. 7a are the same as the steps S 2 to S 9 in the flow shown in FIG. 7c. The content of the step S 31 in the flow shown in FIG. 7c is different from the step S 2 in the flow of FIG. 6c only in that the step S 21 for turning the track cross signal on is eliminated and that a different time is set in the timer.

According to the first embodiment as described, the amplitude of the track error signal is detected by moving the beam spot at a speed high enough to cross a greater number of tracks than the number of tracks crossed due to the presence of an eccentricity, if any, in the photodisc 23. It is therefore possible to detect the amplitude with a higher level of accuracy and, hence, to attain a higher accuracy of the tracking gain control. In addition, since the beam spot is moved to cross the tracks at high speed, a greater number of tracking error signals are obtained in a short time, so that the track gain control can be completed in a shorter period of time. Furthermore, the tracking gain control is performed with a simple arrangement.

The first embodiment as described enables the control of the tracking gain even when the rotation speed of the photodisc 23 is low. Therefore, the tracking gain control can be conducted in the course of start-up of the spindle monitor 22. The influence of the eccentricity is small when the rotation speed is low. It is possible to effect the tracking gain control without being substantially affected by the eccentricity when the rotation speed is low.

In the case where the recording/reproducing apparatus is of the type which permits replacement of the photodisc 23, the photodisc 23 inserted through a disc insertion opening is conveyed to a turn table by means of a loading mechanism. When the disk is correctly placed on the turn table, the spindle motor 22 is started to rotate the turn table and, hence, the disc. It is therefore clear that the rotation sensor 41 shown in FIG. 3 may be substituted by a sensor 42 capable of sensing the presence of the photodisc 23 as shown by a broken line, so that the tracking gain control is conducted in accordance with the output from this sensor 42. This sensor 42 also may be formed of a photo-reflector or the like means.

In this case, too, it is possible to effect the gain control in a short time without requiring waiting time until the spindle is accelerated to a predetermined speed.

When the apparatus is not of the type which permits the replacement of the photodisc 23, the arrangement may be such that the tracking gain control is commenced upon detection of the start up of the tracking gain control circuit to an operative state.

A second embodiment of the present invention will be described hereinunder.

The second embodiment of the recording/reproduction apparatus of the present invention is of the type which makes an access to an object track through a multitrack jump at a constant track crossing speed. In this embodiment, therefore, the tracking gain control is conducted in such a manner that the beam spot is moved across tracks at a constant speed.

Figure 8:
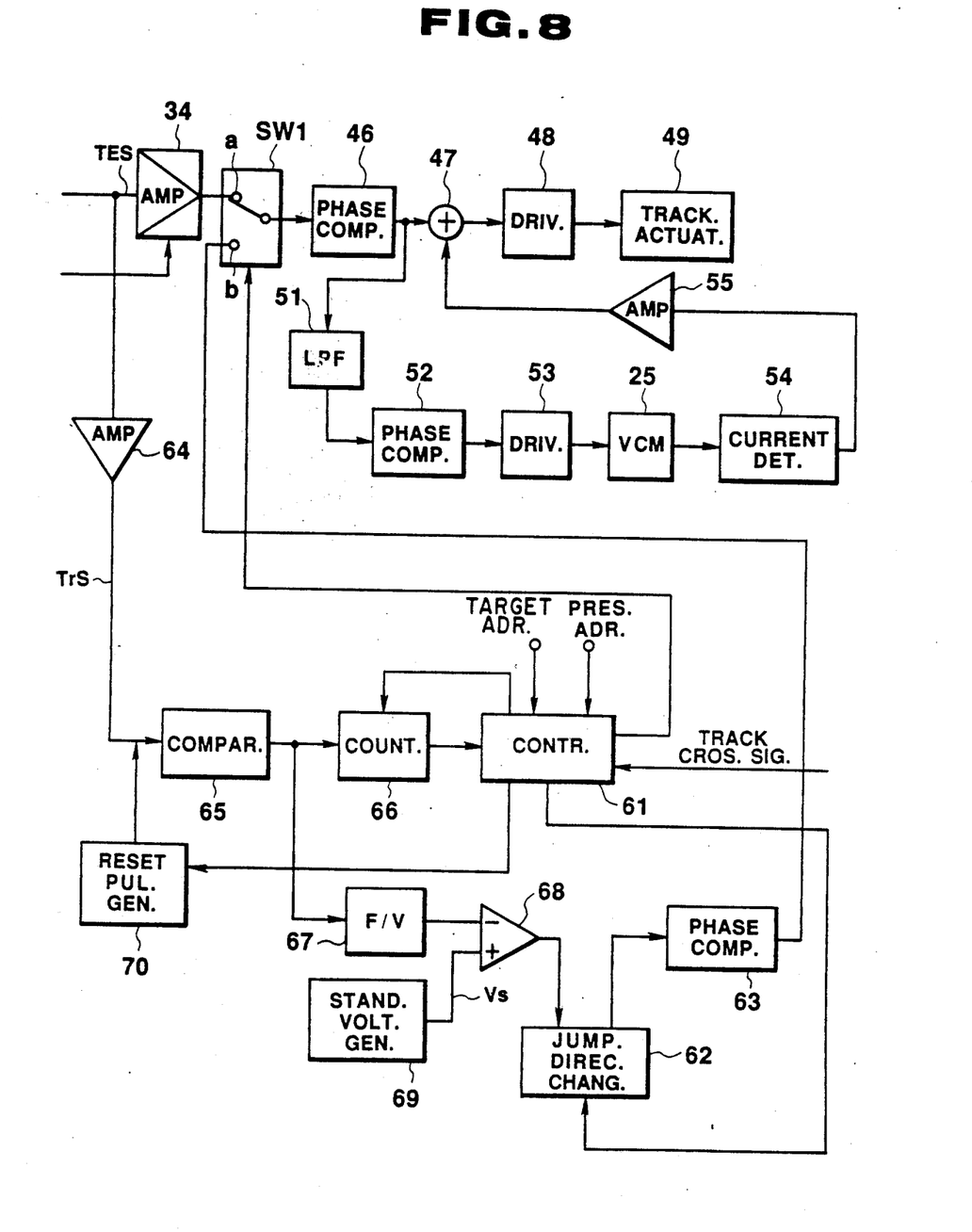
FIG. 8 is a block diagram of a critical portion of a second embodiment of the present invention.

FIG. 8 shows the construction of a control system which enabling a track access through a multitrack jump.

The track error signal TES generated by track error signal generating circuit 33a in the first embodiment is input to a contact a of a switch SW1 through the variable gain amplifier 34. The signal through the contact a of the above mentioned switch SW1 is compensated in phase through a phase compensating circuit 46 and is then input to a tracking actuator (briefly mentioned as a Tr actuator hereinafter) 49 through an adder 47 and driver 48 so that the tracking may be set in the controlled state and the condensed light beam may be made to trace the present track by the objective lens 30. In such a case, the signal through the above-mentioned phase compensating circuit 46 is input to the VCM 25 through a low pass filter 51, phase compensating circuit 52 and driver 53 to control this VCM 25 with a track error signal TES. The driving current input to this VCM 25 is detected by a current detecting circuit 54 is amplified by an amplifier 55 and is then input into the above mentioned adder 47. Therefore, the above-mentioned track error signal TES is used for the control of moving the object lens 30 to trace the objective track and for the control of the entire moment (coarse movement) of the optical pickup by the VCM 25.

That is to say, with the tracking control by using only the objective lens 30 (Tr actuator 49), in case the eccentricity of the photodisc 23 is large, the tracking may be difficult in the movable range of only the Tr actuator 49. Therefore, the signal on the low band side in the track error signal TES is input to the VCM 25 so that the VCM 25 may be driven in response to the track movement by the eccentricity of the photodisc 23 and the entire optical pickup 24 may be moved to absorb the influence of the photodisc eccentricity. Also, in case the VCM 25 moves, its acceleration is detected by a current detecting circuit 54 using a pickup coil or the like and is partly superimposed on the signal driving the Tr actuator 49 and the objective lens 30 is also moved with the movement of the VCM 25 to inhibit a relative acceleration from being produced between the VCM 25 and objective lens 30, to prevent the objective lens 30 from vibrating and to make a smooth tracking control.

By the two-step tracking control with the above-mentioned Tr actuator 49 and VCM 25, even in case the eccentricity of the photodisc 23 is large, the tracking will be able to beheld in a controlled state by keeping the objective lens 30 in the moving range only near the substantially equebrated position.

Now, in the case of making access to the objective track from the present track, access can be made to the objective track within a short time by a multitrack jump.

Figure 9A:
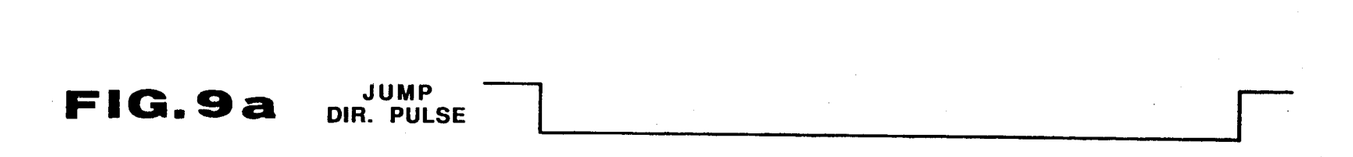

In the case of making this multitrack jump, a controller 61 will output to the above mentioned switch SW1 a jump directing pulse itself shown in FIG. 9a (or FIG. 10a) or a switching signal synchronized with it to switch the contact b side on.

The above-mentioned controller 61 operates the difference between the address of the present track (which is decoded from the output of the signal RS) and the address of the objective track, determines by the positive or negative sign whether to jump to the inner peripheral side track or to the outer peripheral side and controls the switching of the jump direction switching circuit 62.

Figures 10A, 10B:
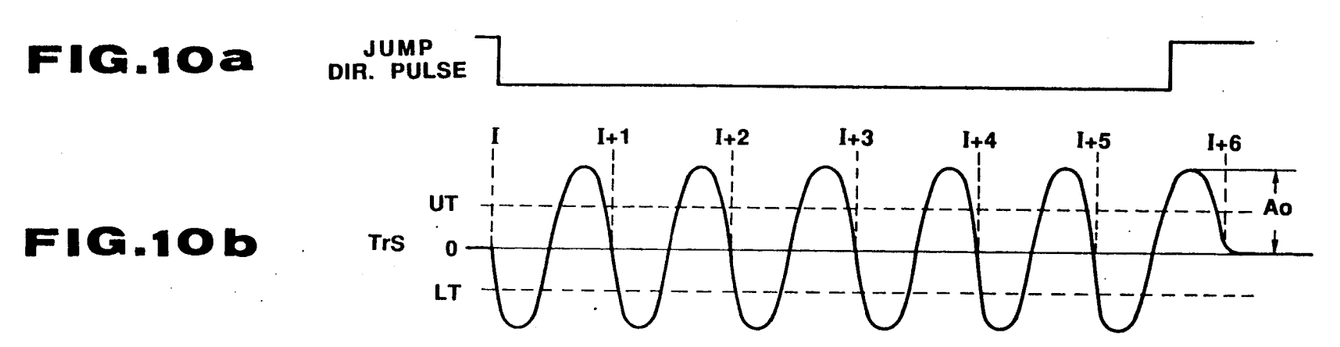

That is to say, the polarity of the driving signal for the multitrack jump is changed in response to either direction. On the basis of the jump pulse directing pulse shown in FIG. 9a (or 10a), the controller 61 inputs through the jump direction switching circuit 62, phase compensating circuit 63, switch SW1 and phase compensating circuit 46 a jump driving signal to the Tr actuator 49 on one hand through the adder 47 and driver 48 and a driving signal to the VCM 25 on the other hand through the LPF 51, phase compensating circuit 52 and driver 53.

The same as in the case of the above described tracking control, a part of the driving signal of this VCM 25 is input into the adder 47 through the current detecting circuit 54 and amplifier 55 to produce in the objective lens 30 the same acceleration as the acceleration generated in the VCM 25 to make a track jump. The eccentricity of the photodisc 23 is considered to exist at the time of the track jump and its influence can be dissolved by moving the VCM 25. Even in case the number of tracks crossed in the case of the multitrack jump is high, the multitrack jump will be able to be made without being influenced by the movable range of the Tr actuator 49.

For example, in case a light beam is moved by the Tr actuator 49 from a position near the equebrated position, when the movement quantity becomes large, such a resilient member as a spring forming the Tr actuator 49 and movably holding the objective lens 30 will reach its resiliency limit, the movement quantity of the objective lens for the driving current will not be constant and the tracing response will be anticipated to vary. The jump to the objective track may not be made and may have to be suspended on the way. On the other hand, as in this embodiment, when the VCM 25 is moved as operatively connected, such a defect will be able to be dissolved.

Figure 9B:
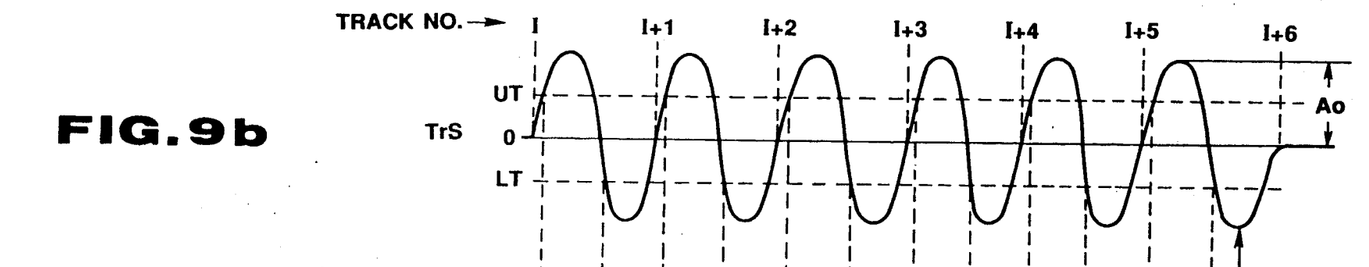
Figure 9C:
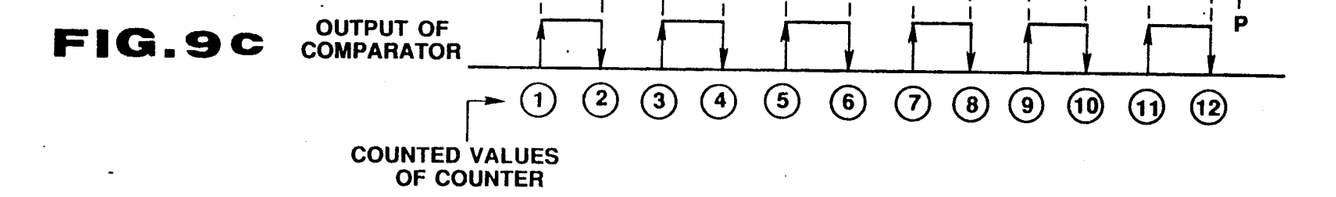
Figure 10C:
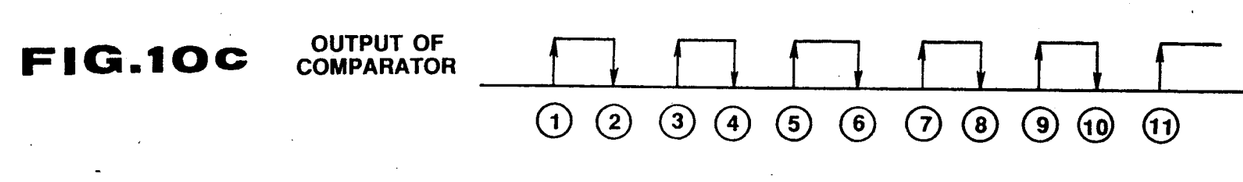
Figure 11:
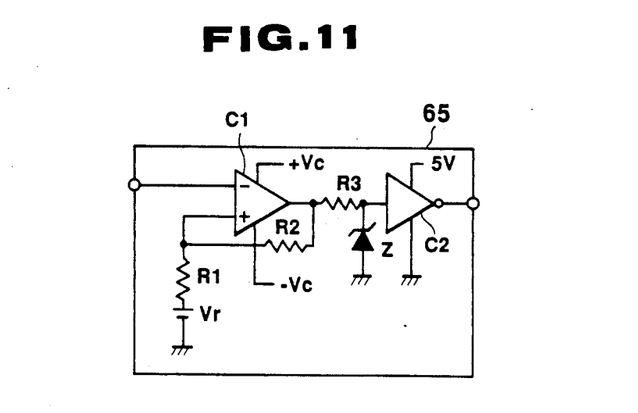
FIG. 11 is a circuit diagram showing the circuit arrangement of a comparator used in the second embodiment.

At the time of the multitrack jump of the objective lens 30 while the above-mentioned VCM 25 is also moved, the track error signal is input into the comparator 65 through the amplifying amplifier 64. The track error signal in the case of passing through this amplifier 64 will be an S-shaped waveform signal (represented by TrS) as shown in FIG. 9b (or FIG. 10b). This signal TrS is shaped in the waveform by the comparator 65 to be a 2-valued square wave as shown in FIG. 9c (or FIG. 10c). This comparator 65 forms a hysteresis comparator having hysteresis levels UT and LT as shown by the broken lines in FIG. 9b (or FIG. 10b). With the hysteresis level UT (or LT) of a size which is $\frac{1}{3}$ to $\frac{2}{3}$ of the amplitude Ao of this signal TrS, the influence of the noise is made as small as possible. That is to say, the hysteresis level is made deep to prevent a mis-count. This hysteresis comparator is so formed as to make a positive feedback from the output end of an OP amplifier Cl to the non-inverted input end as shown in FIG. 11. The level Vr in series with the resistance R1 is a level slightly greater than 0. In this case, by the positive feedback, against the input signal of a level not exceeding the level $UT = Vr + VH \cdot R1/(R1+R2) \approx VH \cdot R1/(R1+R2)$ (where VH represents a voltage level at "H" in the OP amplifier C1), the output of the OP amplifier C1 will be "H" and will be inverted to be "L" by an inverter C2 provided on the output side.

Against the input signal of the level exceeding the above mentioned UT, the output of the OP amplifier Cl is "L" and the output of the inverter C2 is "H". By this inversion, the OP amplifier Cl having made the positive feedback of this output will hold "L" until an input signal below the level $LT \approx VL \cdot R1/(R1+R2)$ (where $-VL$ represents a voltage level at "L"). A Zener diode Z provided on the output side of the OP amplifier C1 is to make the 2-valued output convertible, for example, with the TTL or the like (to convert (clamp) the input level to the inverter C2 to the 0 level).

The output of the above mentioned comparator 65 is input into a counter circuit 66 and is input into a frequency/voltage (F/V) converter 67 and is converted to the voltage of a level in response to the frequency.

In the above mentioned counter circuit 66, the count value corresponding to the number of jumped tracks is preset in making a multitrack jump with the controller 61 so that, when this preset value is reached, it will be known to the controller than the predetermined number of tracks have been jumped.

Figure 12A:
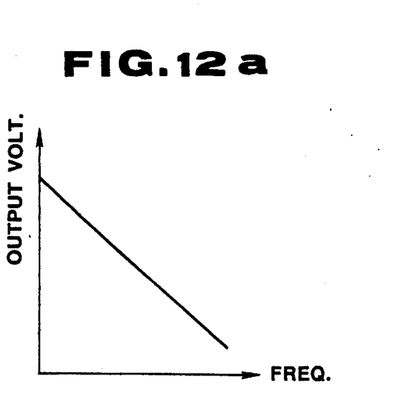
FIGS. 12a and 12b are charts showing the characteristics of an F/V converter used in the second embodiment.
Figure 12B:
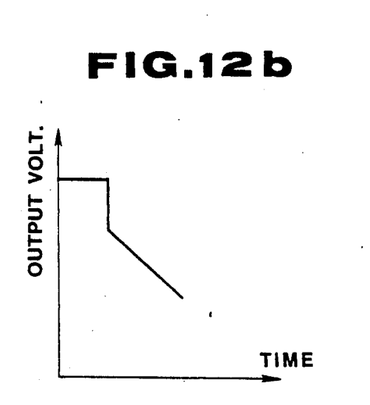

On the other hand, the converted output signal of the above-mentioned F/V converter 67 is input into the differential amplifier 68 and is compared with the standard voltage of the standard voltage generator 69 and the differential output component is added to the jump direction switching circuit 62. The input and output characteristics (F-V conversion characteristics) of the above mentioned F/V converter 67 are shown in FIG. 12a. In this embodiment, the F-V conversion characteristics are made negative characteristics in which, the lower the frequency, the larger the converted voltage level so as to be also of a function of a kick pulse generating circuit. That is to say, if the controller 61 sets the polarity of the jump direction switching circuit 62 at the time of starting a multitrack jump, the level of the converted voltage of the F/V converter 67 will become a maximum level at the starting time. As shown in FIG. 12b, the converted voltage at the starting time is input as a track jumping driving signal to the Tr actuator 49 and VCM 25 side through the differential amplifier 68 and jump direction switching circuit 62. (Instead of the combined use, the driving signal may be output from the controller 61).

The size of this driving signal must be made larger than the maximum value of the track moving speed by the eccentricity of the photodisc 23.

In the above mentioned standard voltage generator 69, after the multitrack jump, in case the tracking control mode is switched on to make access to the objective track, a standard voltage Vs corresponding to the vicinity of the maximum value of the track corresponding to the vicinity of the maximum value of the track crossing speed which can stably retract the beam to the objective track but to the crossing speed not exceeding this maximum value will be generated. (Here, the maximum value of this track crossing speed if represented by a voltage level converted by the above mentioned F/V converter 67.) That is to say, in the case of a multitrack jump, if the output of the F/V converter 67 is kept near this standard voltage Vs, the track will be able to be positively retracted.

After a multitrack jump is started, the objective lens 30 or the like will move and, in response to the eccentricity of the photodisc 30, the moving speed of the objective lens 30 and the moving speed of the VCM 25, the output level of the F/V converter 67 will vary. The difference between this output level and the standard voltage Vs level 69 is detected by the differential amplifier 38. In case there is a difference from the level of this standard voltage Vs, the level difference will be controlled to be zero by a feedback loop. The actual track crossing speed is held at a speed corresponding to this standard voltage Vs.

On the other hand, the controller 61 receives a track cross signal from the CPU used in the first embodiment and serving in this embodiment as a commanding device. Upon receipt of the track cross signal, the controller 61 supplies the jump drive signal to the tracking Tr actuator 49, as is the case of receipt of the jump instruction pulse mentioned before, thereby to supply the VCM 25 with the driving current signal. The count value corresponding to the number of jumped tracks from the controller 61 is not preset in the counter 66, so that the track jump is continued as long as the track cross signal is being received.

The controller 61 effects the jumping operation without delay after the receipt of the track cross signal, so that the the constant crossing speed has not been reached in the beginning of the jumping operation. In order to overcome this problem, the sampling instruction is issued with a predetermined delay or the timing of start of the 33 msec timer used in the step S 22 of the flow in FIG. 6c is suitably delayed, so as to prohibit the jumping until the constant crossing speed is reached. The tracking gain control is conducted in the same manner as the first embodiment during the track jumping operation, thus attaining an adequate value of the tracking gain.

Now, in order to stably retract the track to the objective track, before crossing the objective track, a tracking servo state is switched on to retract it to the objective track. In this case, it is preferable as a timing for setting the tracking servo state that the point which the track error signal zero crosses after the timing corresponds to the objective track.

This manner will be explained in the following with reference to FIGS. 9 and 10.

FIG. 9b shows a track error signal TrS in case a multitrack jump (a 6-track jump in this diagram) is made on the inner peripheral side.

In this case, there is shown a manner in which the present track makes at I a multitrack jump to an objective track (I+6) track. The cross points of the actual tracks I, I+1, I+2, ... in FIG. 9b are zero cross points in the right rising waveform parts.

These track error signals TrS are counted as shown in FIG. 9c. From a point P at which the track error signals TrS reach a negative peak after 12 (2 N in the general case) which are twice as many as the difference 6 (N in the general case) until the objective track are counted, that is, form the part ¼ wavelength before the objective track (I+6), a servo retractable range starts.

Therefore, the counter circuit 66 counts the rising and falling edges of the signals 2-valuing the track error signals by twice the number of the tracks until the objective track and then outputs to the controller 61 the signal having multitrack-jumped the predetermined number of tracks and the controller 61 receives it, releases the track jumping directing pulse and switches the switch SW1 to the tracking servo mode on which the contact is switched.

From the output of the above mentioned counter circuit 66 until the controller 61 switches the switch SW1, there is a slight time delay. The timing when the switch SW1 becomes the tracking servo mode is after the point P in FIG. 9b by this delay. (That is to say, ¼ wavelength before, the track is retracted.) Therefore, by this switching to the tracking servo mode, the track error signal TrS having negatively fed back the track position movement can be stably retracted into the zero crossing position, that is, the objective track.

The second reason why the hysteresis of the above mentioned comparator 65 is made large is that the time when the counter circuit 66 has made a predetermined number of counts can be set closely enough to the time retractable into the objective track. (The mere zero cross is further ¼ wavelength before the tracking servo retractable range and, when the tracking servo mode is immediately switched, the beam will not be able to be retracted into the objective track in some cases.)

That is to say, in case the track jump is made in the inner peripheral direction, the right rising part will be a track retractable area and the right falling part will be an inverse characteristic area. Therefore, when the hysteresis is made deeper, when the counts reach the predetermined number and the jump driving signal is suspended, as the track retractable area has been approached, the beam will be able to be stably retracted. (Reversely speaking, the escape from the inverse characteristic area becomes easy.)

On the other hand, in the case of the outer peripheral direction movement, contrary to the case of the inner peripheral direction movement, the right falling part will be a track retracting area. In this case, too, the operation will be made on the same hysteresis level and the signal on the track will be output still ¼ wavelength before. (The tracking servo mode is switched.)

In the case of this outer peripheral direction movement, the comparator 65 will not operate for the track error signal of the first half wavelength (with this half wavelength, the level UT will not be exceeded) and therefore no 2-valuing pulse will appear. Therefore, the timing of stopping the jump is carried out after the count of 2 N−1, that is, one less. (For example, the preset value of the counter 36 from the controller 31 may be set at 2 N in the case of the inner peripheral side movement and at 2 n−1 in the case of the outer peripheral side movement.)

Figure 13A:
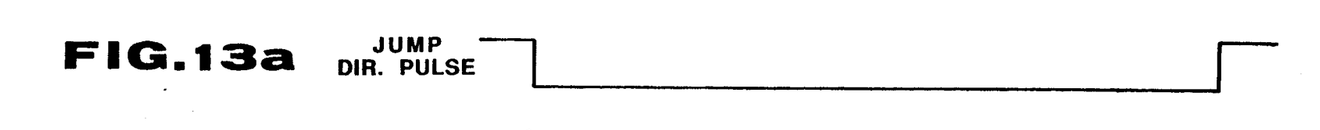
FIGS. 13a to 13f are illustrations of operation of the second embodiment when a radially inward track jump is conducted following a radially outward tracking jump.
Figure 13B:
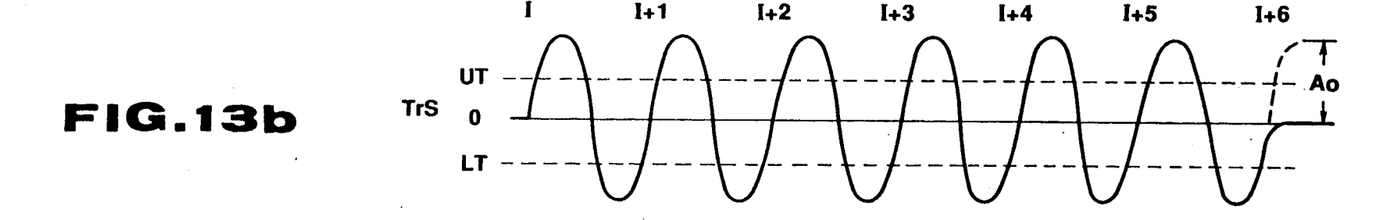
Figure 13C:
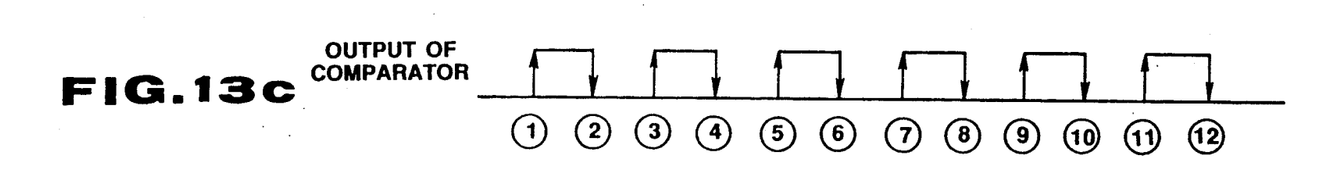
Figure 13D:
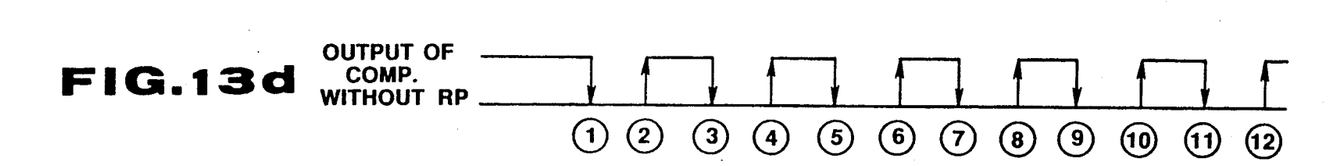
Figure 13E:
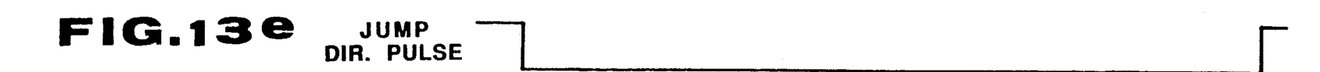
Figure 13F:
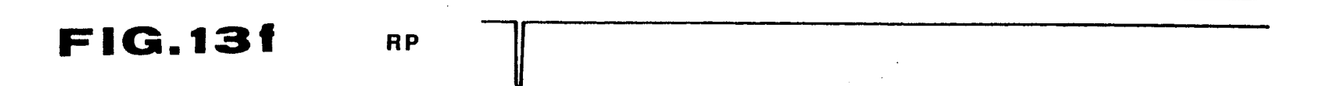

Now, after the jump on the outer peripheral side to the objective track, the output of the comparator 65 will be "H". If the track jump in the inner peripheral direction is made as it is with the next jump direction, as shown in FIG. 11d, after 12 (2 N in the general case) counts, the jump directing pulse will be released as shown in FIG. 11e, therefore an on-track direction will be output in the inverse characteristic part of the track error signal TrS, the likelihood of the failure of the on-track (in this case, as shown by one-point chain line in FIG. 13b) will be high and the jump number precision will deteriorate. Therefore, in this embodiment, a resetting pulse generating circuit 70 is provided as shown in FIG. 8, the falling part at the starting time point of the jump directing pulse is differentiated to produce a pulse RP shown in FIG. 13f, this pulse RP is applied to the input end of the comparator 65 so that the output of the comparator 65 may be "L" and then, when the track error signal TrS exceeds the level UT, "H" will be able to be detected.

According to this embodiment, in case a multitrack jump is to be made, the track error signal TrS is 2-valued, a multitrack jump is made until ¼ wavelength before the objective track, the frequency of the track error signal in switch case is detected (including the eccentricity of the photodiscs 23) to detect the actual track crossing speed and such moving speed (crossing speed) controlling means as makes the crossing speed a servo-retractable fixed speed is formed. By this moving speed controlling means, even in case the photodisc 23 is eccentric, the eccentricity will be compensated and a fixed crossing speed will be able to be retained. As this crossing speed is a track retractable speed, in case the jump direction is released and the track servo mode is switched on, a stabilized track retraction will be able to be made.

In this embodiment, when the multitrack jump is executed, the drive signal is supplied to the Tr actuator 49 and, at the same time, part of the drive signal is delivered also to the VCM 25 so as to operate the VCM 25 in relation to the operation of the Tr actuator 49. It is therefore possible to effect a track jump over a large number of tracks in one multitrack jumping cycle without being restricted by the range over which the Tr actuator 49 is movable.

Thus, according to the second embodiment, it is possible to obtain a high accuracy of the peak hold by virtue of the fact that the relative velocity between the objective lens 30 and the track is held constant.

What is claimed is:

1. A loop gain control device for a tracking servo system, comprising:
    a beam generating means for generating a light beam for recording or reproduction of information in and from an optical recording medium having information recording tracks;
    an objective lens applying said light beam to said optical recording medium;
    lens actuator means for driving said objective lens in a direction to cross said tracks in response to an input signal;
    a photosensing means for receiving the light beam reflected from said optical recording medium;
    tracking error signal generating means for generating, from an output of said photosensing means, a tracking error signal indicative of an offset of a beam spot, formed by said light beam on said optical recording medium, from an object track;
    variable gain means for amplifying said tracking error signal with a variable gain;

drive signal generating means for generating a drive signal which enables said lens actuator means to drive said objective lens in a direction to cross said tracks;

switching means which, when turned on, enables an output from said variable gain means to be delivered to said lens actuator means to set up a tracking servo which causes said beam spot to trace said object track;

amplitude detection means for picking up said tracking error signal and for detecting an amplitude of said tracking error signal when said switching means is turned off to enable said drive signal to be delivered to said lens actuator means so that a velocity of said beam spot crossing the tracks is larger than a crossing velocity of said beam spot crossing the tracks caused by eccentricity of said optical recording medium; and gain control means for controlling the gain of said variable gain means to a predetermined value in accordance with the detected amplitude.

2. A gain control device according to claim 1, wherein said amplitude detection means detects maximum and minimum values of said tracking error signals and determines said amplitude from said maximum and minimum values.

3. A gain control device according to claims 1 and 2, wherein said drive signal generating means supplies said lens actuator means with said drive signal of a level which provides a higher track crossing speed than the track crossing speed which is caused by eccentricity of at least one of said optical recording medium and a spindle motor which rotatingly drives said optical recording medium.

4. A gain control device according to one of claims 1 and 2, wherein said drive signal generating means supplies said lens actuator means with said drive signal of a level which provides a constant track crossing speed.

5. A gain control device according to one of claims 1 and 2, wherein said amplitude detection means operates in a period near start up of a rotational driving of said optical recording medium.

6. A gain control device according to one of claims 1 and 2, wherein said amplitude detection means is triggered by an output from a sensor capable of sensing that said optical recording medium has been placed on a turn table.

7. A gain control device according to one of claims 1 and 2, wherein said amplitude detection means and said gain control means are constituted by a CPU.

8. A gain control device according to claim 2, wherein said amplitude detection means picks up successive ones of said tracking error signal and determines whether a level of each tracking error signal is greater than a maximum level of a previous tracking error signals and whether a level of each tracking error signal is smaller than the minimum value of the previous tracking error signals, said amplitude detection means repeats to update the maximum and minimum values when affirmative answers are obtained in the determination, thus detecting the maximum and minimum values of said tracking error signals.

* * * * *